(12) United States Patent
Li

(10) Patent No.: US 11,635,612 B2
(45) Date of Patent: Apr. 25, 2023

(54) LIGHT CONTROL SYSTEM WITH CUBE-SHAPED, TWO-DIMENSIONAL TUNABLE PRISMS

(71) Applicant: HONEYWELL INTERNATIONAL INC., Charlotte, NC (US)

(72) Inventor: Wei Li, Urbana, OH (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/305,393

(22) Filed: Jul. 7, 2021

(65) Prior Publication Data

US 2023/0011417 A1    Jan. 12, 2023

(51) Int. Cl.
*G02B 26/00* (2006.01)
*F21V 5/02* (2006.01)
*F21Y 115/10* (2016.01)

(52) U.S. Cl.
CPC .............. *G02B 26/004* (2013.01); *F21V 5/02* (2013.01); *F21Y 2115/10* (2016.08)

(58) Field of Classification Search
CPC ....... G02B 26/004; F21V 5/02; F21Y 2115/10
See application file for complete search history.

(56) References Cited

U.S. PATENT DOCUMENTS

| | | | | |
|---|---|---|---|---|
| 6,839,095 | B2 * | 1/2005 | Bierhuizen | G03B 21/006 362/302 |
| 6,980,280 | B2 * | 12/2005 | Roddy | B41J 2/465 353/30 |
| 2009/0122417 | A1 | 5/2009 | Hou | |
| 2009/0257111 | A1 | 10/2009 | Heikenfeld et al. | |
| 2012/0287657 | A1 | 11/2012 | Sarma et al. | |
| 2017/0018214 | A1 | 1/2017 | Black et al. | |
| 2018/0038576 | A1 | 2/2018 | Mao | |

FOREIGN PATENT DOCUMENTS

| | | |
|---|---|---|
| CN | 102103231 A | 6/2011 |
| CN | 202230221 U | 5/2012 |
| CN | 107942423 A | 4/2018 |
| CN | 108387958 A | 8/2018 |
| WO | 2018097869 A2 | 5/2018 |

* cited by examiner

*Primary Examiner* — Andrew J Coughlin
*Assistant Examiner* — Jessica M Apenteng
(74) *Attorney, Agent, or Firm* — Lorenz & Kopf, LLP

(57) ABSTRACT

A light control system includes a housing, a controllable power source, a light source, and a plurality of cube-shaped tunable prisms. The controllable power source supplies at least four variable voltages. The light source is operable to emit a light beam. The cube-shaped tunable prisms are arranged in a manner so there are no gaps between adjacent tunable prisms. Each tunable prism receives a portion of the emitted light beam, each has a tunable deflection angle that is variable in two dimensions, and each is configured to optically steer the emitted light beam in the two dimensions based on the tunable deflection angle. Each tunable prism is further coupled to receive the four variable voltages. Each tunable prism comprises a liquid that varies the tunable deflection angle in two dimensions in response to the four variable voltages supplied thereto, to thereby deflect the light beam.

16 Claims, 6 Drawing Sheets

LIGHT CONTROL SYSTEM WITH CUBE-SHAPED, TWO-DIMENSIONAL TUNABLE PRISMS

TECHNICAL FIELD

The present invention generally relates to light control systems, and more particularly relates to a light control system that includes an array of cube-shaped, two-dimensional tunable prisms.

BACKGROUND

Many lighting applications rely on beam steering. For example, search-and-rescue aircraft rely on searchlights to continuously move a light beam along the surface to find and/or track various entities. Another example is stage lighting, in which light beams are moved to track various actors as they move onstage. Yet another example is in the context of terrestrial vehicles. In particular, when a vehicle is climbing a hill, the range of the headlamp light beam may be shortened. Thus, the angle at which the light beam is transmitted from headlamp can be raised to compensate for the shortened range. Similarly, when the vehicle is moving downhill, the range of the headlamp light beam may increase. This may be helpful to the driver, but it may also cause increased glare for oncoming drivers. Thus, lowering the angle at which the light beam is emitted from the handlamp may be advantageous when the vehicle is going downhill Currently, most light control systems implement a beam steering function via mechanical means. For example, many rely on motor driven actuation to steer the light beam in one or two dimensions. Although generally reliable and robust, the mechanical implementations can be relatively heavy, costly, and occupy a large space volume. While various non-mechanical beam steering devices have been developed (e.g., optical phased array devices), currently there are no known electrowetting devices that implement two-dimensional beam steering.

Hence, there is a need for a light control system that implements non-mechanical, liquid based, two-dimensional beam steering. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a light control system includes a housing, a controllable power source, a light source, and a plurality of cube-shaped tunable prisms. The controllable power source is configured to supply at least four variable voltages. The light source is coupled to the housing and is operable, upon being electrically energized, to emit a light beam. The cube-shaped tunable prisms are coupled to the housing and are arranged in an array in a manner in which there are no gaps between adjacent tunable prisms. Each tunable prism is disposed to receive a portion of the light beam emitted from the light source. Each tunable prism has a tunable deflection angle that is variable in two dimensions and is configured to optically steer the light beam emitted from the light source in the two dimensions based on the tunable deflection angle. Each tunable prism is further coupled to receive the four variable voltages from the controllable power source. Each tunable prism comprises a liquid that varies the tunable deflection angle in the two dimensions in response to the four variable voltages supplied thereto, whereby the deflection of the light beam emitted from the light source varies in response to the four variable voltages supplied to each tunable prism.

In another embodiment, a tunable prism includes a cube-shaped housing, a polar liquid, a first pair of electrodes, a second pair of electrodes, and a grounding electrode. The cube-shaped housing includes first, second, third, and fourth side walls and first and second end walls. The first side wall is spaced apart from the second side wall and is coupled to, and is disposed perpendicular to, the third and fourth side walls. The third side wall is spaced apart from the fourth side wall and is coupled to, and is disposed perpendicular to, the first and second side walls. The first and second end walls are spaced apart from each other, and are each coupled to, and disposed perpendicular to, the first, second, third, and fourth side walls, whereby the first, second, third, and fourth side walls and the first and second end walls define a cube-shaped inner cavity. The polar liquid is disposed within the cube-shaped inner cavity. The first pair of electrodes are coupled, one each, to the first and second side walls. The second pair of electrodes are coupled, one each, to the third and fourth side walls. The grounding electrode is electrically connected to the polar liquid. The first and second end walls are each light transmissive, a dielectric layer is coated on the first, second, third, and fourth side walls, a hydrophobic layer overlies the dielectric layer, and the polar liquid contacts the hydrophobic layer.

In yet another embodiment, a light control system includes a housing, a controllable power source, a light source, and a plurality of cube-shaped tunable prisms. The controllable power source is configured to supply at least four variable voltages. The light source coupled to the housing and operable, upon being electrically energized, to emit a light beam. The cube-shaped tunable prisms are coupled to the housing and are arranged in an array in a manner in which there are no gaps between adjacent tunable prisms. Each tunable prism is disposed to receive a portion of the light beam emitted from the light source. Each tunable prism has a tunable deflection angle that is variable in two dimensions and is configured to optically steer the light beam emitted from the light source in the two dimensions based on the tunable deflection angle. Each tunable prism is further coupled to receive the four variable voltages from the controllable power source. Each tunable prism comprises a liquid that varies the tunable deflection angle in the two dimensions in response to the four variable voltages supplied thereto, whereby the deflection of the light beam emitted from the light source varies in response to the four variable voltages supplied to each tunable prism. The four variable voltages include a first variable voltage, a second variable voltage, a third variable voltage, and a fourth variable voltage, and each of the cube-shaped tunable prisms includes first, second, third, and fourth side walls and first and second end walls. The first side wall is spaced apart from the second side wall and is coupled to, and is disposed perpendicular to, the third and fourth side walls. The third side wall is spaced apart from the fourth side wall and is coupled to, and is disposed perpendicular to, the first and second side walls. The first and second end walls are spaced apart from each other, and are each coupled to, and disposed perpendicular to, the first, second, third, and fourth side walls, whereby the first, second, third, and fourth side walls and the first and second end walls define a cube-shaped inner cavity. A polar and a non-polar liquid are disposed within the cube-shaped inner cavity. A first electrode is coupled to the first sidewall and is coupled to receive the first variable voltage. A second electrode is coupled to the second side wall and is coupled to receive the second variable voltage. A third electrode is coupled to the third side wall and is coupled to receive the third variable voltage. A fourth electrode is coupled to the fourth side wall and is coupled to receive the fourth variable voltage. A grounding electrode is electrically connected to the polar liquid. The first and second end walls are each light transmissive, a dielectric layer is coated on the first, second, third, and fourth side walls, a hydrophobic layer overlies the dielectric layer, and the polar and the non-polar liquids both contact the hydrophobic layer Furthermore, other desirable features and characteristics of the light control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
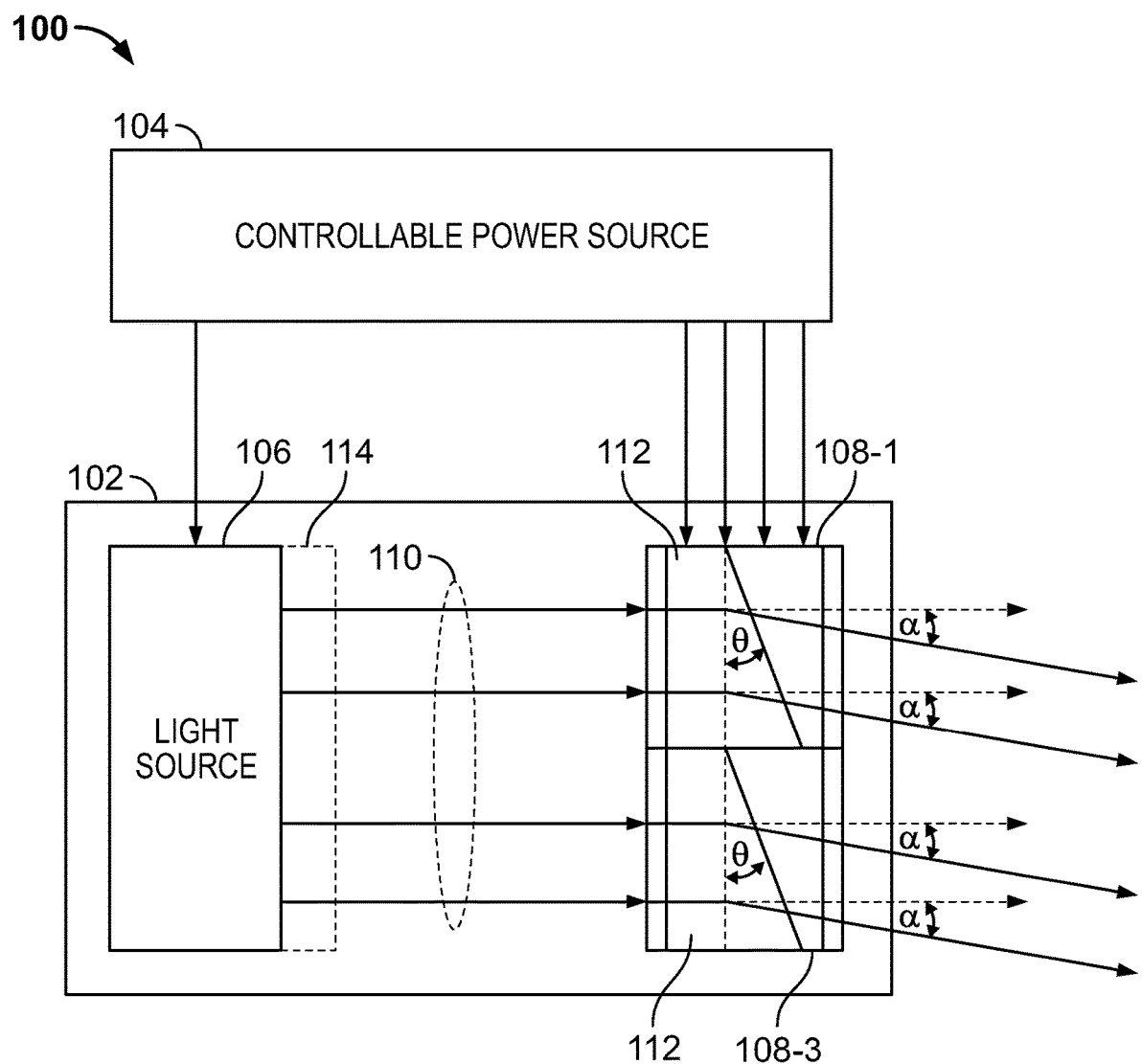
FIG. 1 is a functional block diagram of one example embodiment of a light control system.

Referring first to FIG. 1, a functional block diagram of one embodiment of a light control system 100 is depicted and includes a housing 102, a controllable power source 104, a light source 106, and a plurality of tunable prisms 108. The housing 102 may be variously adapted and configured, depending upon the end-use of the light control system 100. For example, the housing 102 may be adapted and configured to be mounted in or on various types of terrestrial vehicles, various types of aircraft, various types of spacecraft, and various types of seagoing craft (both submersible and non-submersible). The housing 102 may also be adapted for various other end-use environments, as needed or desired.

The controllable power source 104 is configured to supply at least four variable voltages—a first variable voltage, a second variable voltage, a third variable voltage, and a fourth variable voltage. The variable voltages, as FIG. 1 depicts, are supplied to the tunable prisms 108. The purpose for the variable voltages will be described more fully below. As FIG. 1 also depicts, the controllable power source 104 may also be configured to supply a voltage to the light source 106, thereby electrically energizing the light source 106. The voltage supplied to the light source 106 may be fixed or it may also be variable. In other embodiments, the light source 106 may be electrically energized from a power source that is separate and distinct from the controllable power source 104.

Regardless of its electrical energization source, the light source 106 is coupled to the housing 102 and operable, upon being electrically energized, to emit a light beam 110 (for simplicity, depicted using a plurality of individual rays). The light source 106 may be variously configured and implemented. For example, it may be implemented using one or more light emitting diodes (LEDs), one or more lasers, one or more gas discharge lamps, or one or more incandescent lamps, just to name a few. In some embodiments, the light source 106 may be configured to emit white light or it may be configured to emit color light. In some embodiments, the light source 106 may be an individual light source or may be implemented using an array of light sources. Various configurations and implementations of the light source 106 will be discussed further below. Before doings so, however, a description of the tunable prisms 108 will be provided.

Figure 2:
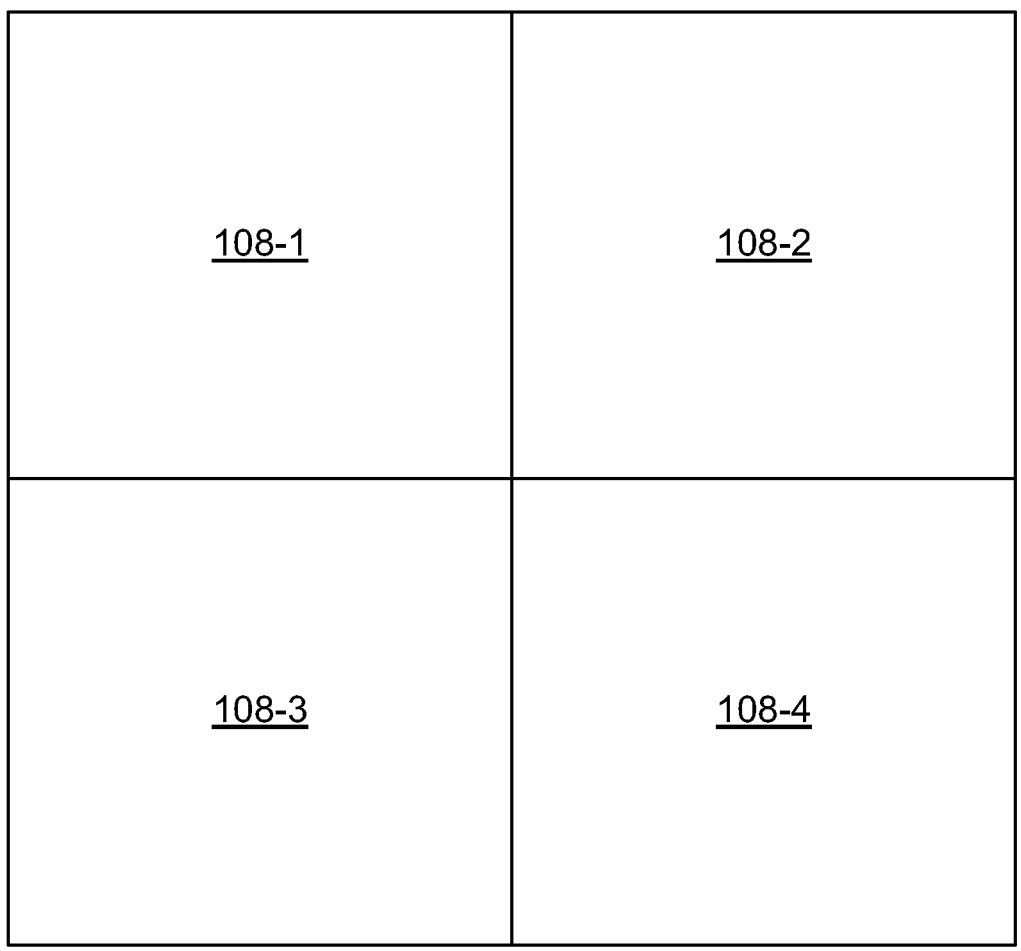
FIG. 2 is a front view of one embodiment of an array of cube-shaped tunable prisms that may be used in the system of FIG. 1.

The tunable prisms 108 are each cube-shaped and are each coupled to the housing 102. As shown most clearly in FIG. 2, the cube-shaped tunable prisms 108 are arranged in an array 200, and in a manner in which there are no gaps between adjacent tunable prisms 108. Although for ease of illustration the depicted array 200 is a 2x2 array of tunable prisms 108 (e.g., 108-1, 108-2, 108-3, 108-4), it will be appreciated that the tunable prisms may be arranged into any one of numerous NxN arrays, where N is an integer greater than 2, and thus resulting in there being (NxN)-number of tunable prisms 108.

No matter the specific number of tunable prisms 108, each tunable prism is disposed to receive a portion of the light beam 110 that is emitted from the light source 106. As will be discussed in more detail below, each tunable prism 108 has a tunable deflection angle ($\theta$) that is variable in two dimensions ($\theta_x$, $\theta_y$). Each tunable prism 108 is thus configured to optically steer the light beam 110 emitted from the light source 106 in the two dimensions based on the tunable deflection angle ($\theta$). To do so, each tunable prism 108 is coupled to receive the four variable voltages from the controllable power source 104, and each tunable prism includes a liquid 112 that varies the tunable deflection angle ($\theta$) in the two dimensions in response to the four variable voltages supplied thereto. Thus, the deflection angle ($\alpha$) of the light beam 110 emitted from the light source 106 varies in two dimensions in response to the four variable voltages supplied to each tunable prism 108.

Figure 3:
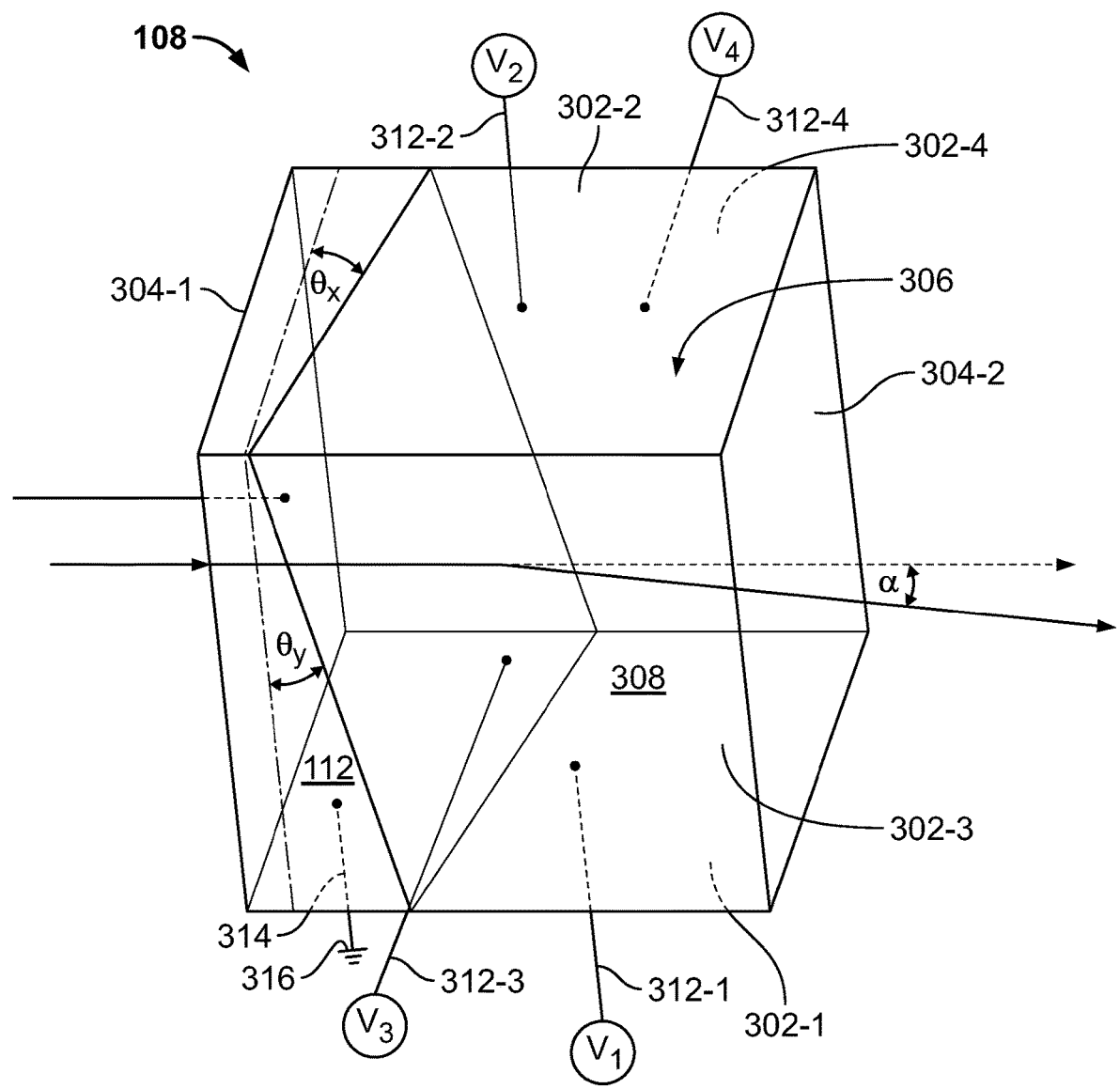
FIG. 3 depicts a perspective view, in simplified, ghosted form, of one embodiment of a single cube-shaped tunable prism.
Figure 4:
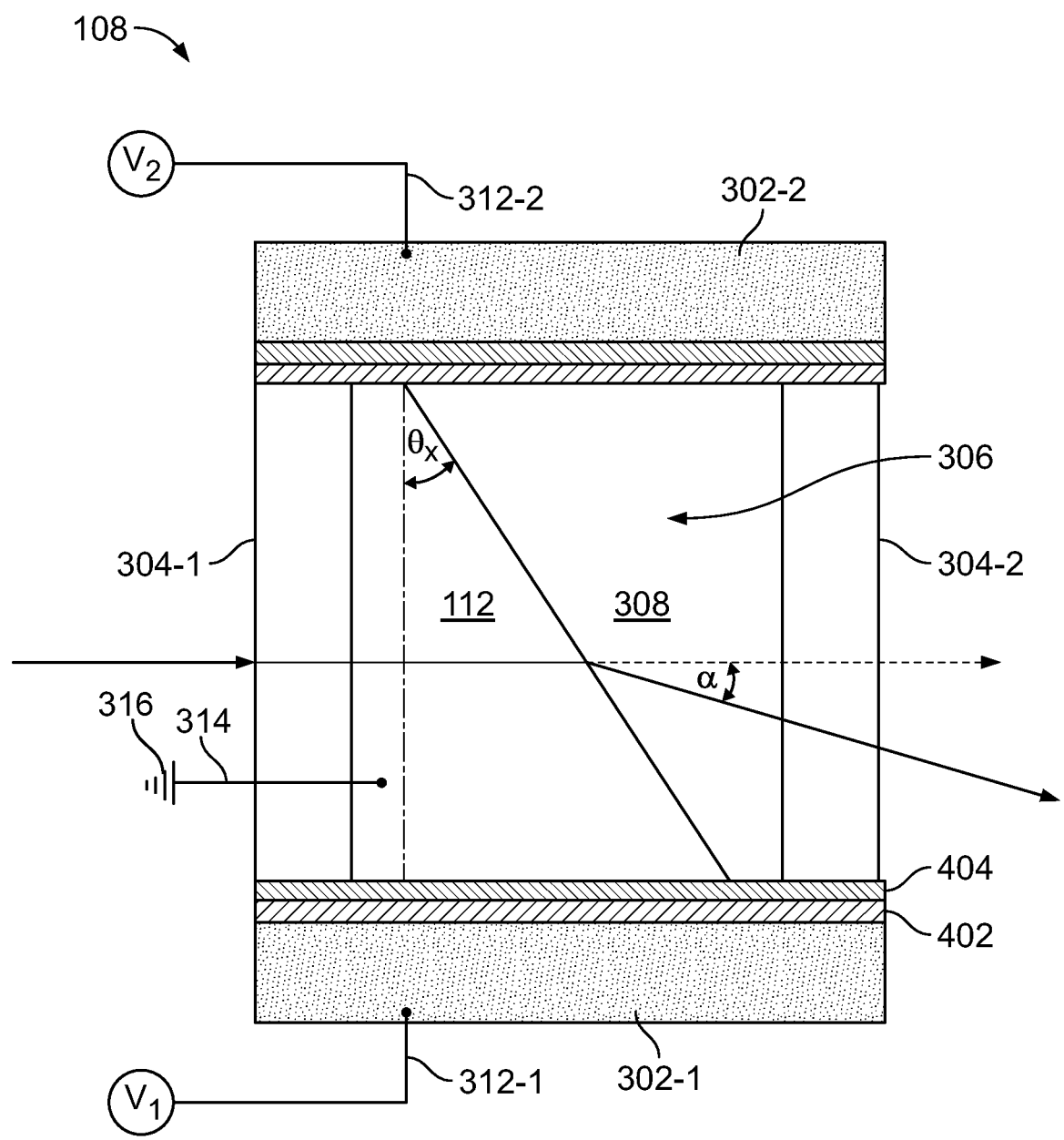
FIG. 4 is a cross section view of the cube-shaped tunable prism depicted in FIG. 3.

Turning now to FIGS. 3 and 4, an embodiment of one of the cube-shaped tunable prisms 108 is depicted and will be described. As depicted in simplified, ghosted form in FIG. 3, the cube-shaped tunable prism 108 includes four side walls 302—a first side wall 302-1, a second side wall 302-2, a third side wall 302-3, a fourth 302-4 side wall—and two end walls 304—a first end wall 304-1 and a second end wall 304-2. The first side wall 302-1 is spaced apart from the second side wall 302-2 and is coupled to, and is disposed perpendicular to, the third and fourth side walls 302-3, 302-4. The third side wall 302-3 is spaced apart from the fourth side wall 302-4 and is coupled to, and is disposed perpendicular to, the first and second side walls 302-1, 302-2.

The first and second end walls 304-1, 304-2 are spaced apart from each other. The first and second end walls 304-1, 304-2 are additionally each coupled to, and disposed perpendicular to, the four side walls 302. As such, the four side walls 302 and the first and second end walls 304-1, 304-2 define a cube-shaped inner cavity 306. As shown more clearly in FIG. 4, the first and second end walls 304-1, 304-2 are each composed of a light transmissive material, such as glass. The four side walls 302 may be formed of light transmissive material or an opaque material. In either case, and as FIG. 4 further shows, a dielectric layer 402, such as $SiO_2$, SiN, $Al_2O_3$ or Parylene is preferably coated on the inner facing surfaces of the four side walls 304, and a hydrophobic layer 404, such as fluoropolymer (Teflon AF or Cytop) preferably overlies the dielectric layer 402.

The previously mentioned liquid 112, which is polar liquid, is disposed within the cube-shaped inner cavity 306 and contacts the hydrophobic layer 404. The polar liquid 112 may vary. In one embodiment, the polar liquid 112 is a saline solution (e.g., salt and water). In other embodiments, the polar liquid 112 may be water, a water-salt-glycerin solution, or a water-ethanol solution, just to name a few. Though not required, in some embodiments a non-polar liquid 308 may also disposed within the cube-shaped inner cavity 306. When included, the non-polar liquid 308 contacts the polar liquid 112 and the hydrophobic layer 404. The non-polar liquid 308 may also vary. In one embodiment, the non-polar liquid 308 is an oil. In other embodiments, the non-polar liquid 308 may be silicon oil or dodecane, just to name a few. As may be appreciated, the polar liquid 112 and the non-polar liquid 308 are immiscible.

As FIGS. 3 and 4 also depict, a first electrode 312-1 is coupled to the first side wall 302-1, a second electrode 312-2 is coupled to the second side wall 302-2, a third electrode 312-3 is coupled to the third side wall 302-3, and a fourth electrode 312-4 is coupled to the fourth side wall 302-4. Preferably, the first electrode 312-1 is coupled to receive the first variable voltage, the second electrode 312-2 is coupled to receive the second variable voltage, the third electrode 312-3 is coupled to receive the third variable voltage, and the fourth electrode 312-4 is coupled to receive the fourth variable voltage. Moreover, a grounding electrode 314 is electrically connected to the polar liquid 306 and to a circuit common 316.

As was previously noted in connection with the description of FIG. 1, and as FIG. 3 shows more clearly, each tunable prism 108 has a tunable deflection angle ($\theta$) that is variable in two dimensions ($\theta_x$, $\theta_y$). As such, tunable prism 108 is thus configured to optically steer the light beam 110 emitted from the light source 104 in the two dimensions based on the tunable deflection angle ($\theta$). When there is no difference in voltage potential between the side walls, the tunable deflection angle ($\theta$) is zero and, as FIGS. 1, 3, and 4 depict using the dashed lines, the deflection angle ($\alpha$) of the light beam 110 is also zero, which means the light beam 110 exits without deflection.

However, when there is a voltage potential between the side walls 302, the tunable deflection angle ($\theta$) is non-zero, in either one or both dimensions. As a result, the deflection angle ($\alpha$) of the light beam 110 is also non-zero, which means the light beam 110 is deflected. In the example embodiment depicted in FIG. 3, there is a voltage potential between the first and second side walls 302-1, 302-2, and a voltage potential between the third and fourth side walls 302-3, 302-4. This means the tunable prism 108 has a tunable deflection angle in two dimensions ($\theta_x$, $\theta_y$). As a result, the light beam 110 is also defected in two dimensions—that is, the deflection angle ($\alpha$) of the light beam 110 also has two dimensional components ($\alpha_x$, $\alpha_y$).

Figure 5:
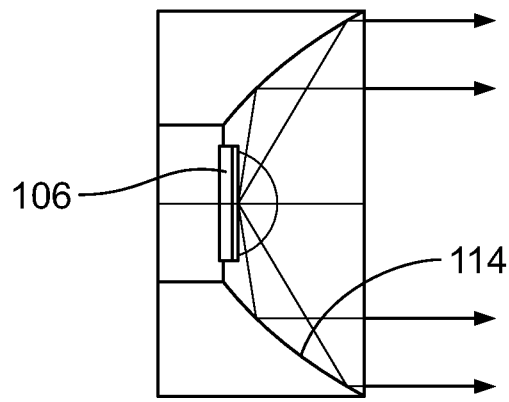
FIGS. 5-7 depict three different example embodiments of non-variable optics that may be used in the system of FIG. 1.
Figure 6:
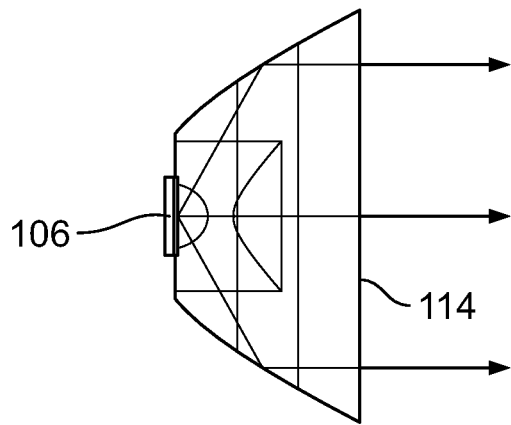
Figure 7:
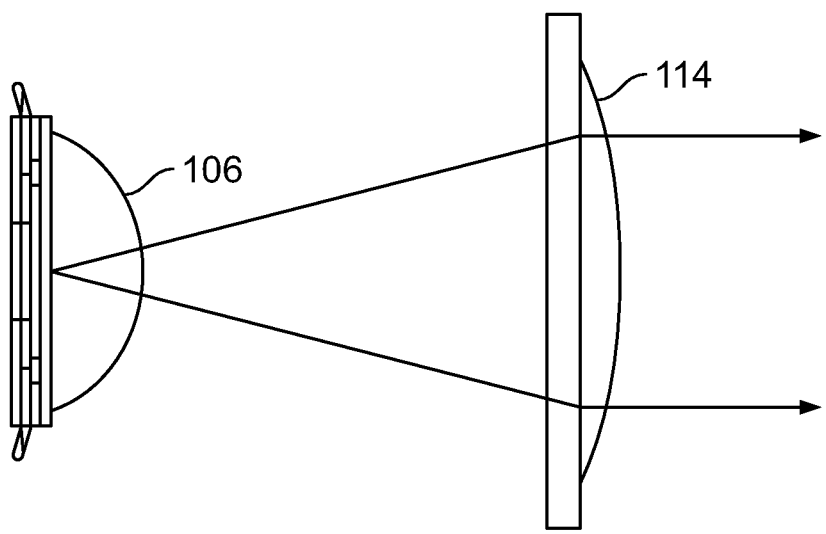

Returning now to FIG. 1, in some embodiments the light control system may include one or more optic elements 114, which are depicted in phantom in FIG. 1. The one or more optic elements 114, when included, are preferably non-variable optics 114 and are coupled to the housing 102 and are disposed between the light source 106 and the tunable prisms 108. The specific type of non-variable optic 114 that is used may vary and may depend, for example, on the specific light source 106 used. In some embodiments, a single non-variable optic 114 or multiple non-variable optics 114 may be used and each may be configured as a reflector, such as the one depicted in FIG. 5, an a total-internal-reflection (TIR) lens, such as the one depicted in FIG. 6, or an optic lens such as the one depicted in FIG. 7 When a plurality of non-variable optics 114 are used, each non-variable optic 114 may be disposed between the light source 106 and a different one of the tunable prisms 108.

Figure 8:
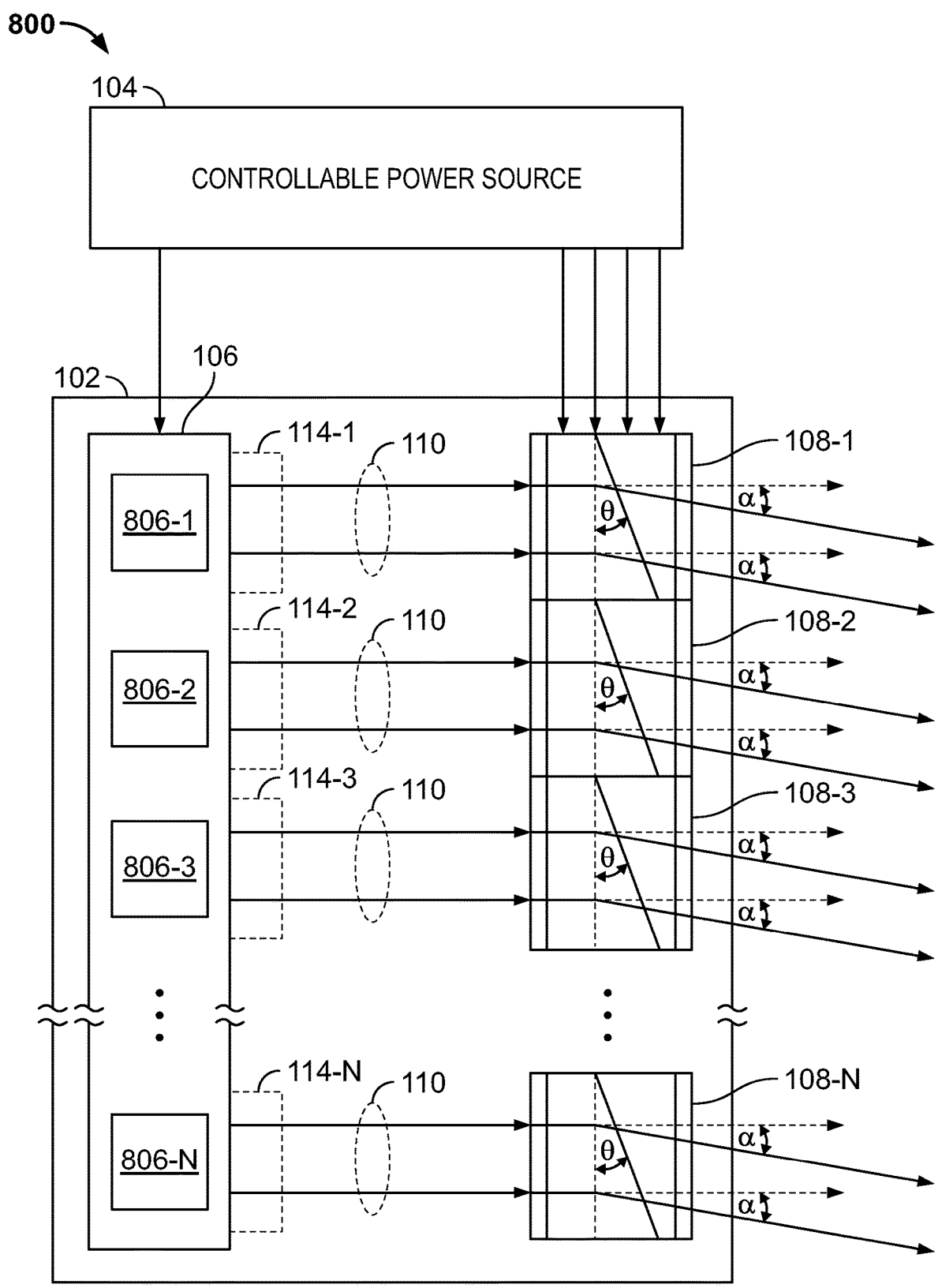
FIG. 8 is a functional block diagram of another example embodiment of a light control system.

As is generally known, white light is composed of all the different wavelengths (e.g., different colors) in the visible spectrum. It is also generally known that a prism can separate white light into its different spectral wavelengths; that is, into its different constituent colors. For some applications, such as those that require uniform white light, this color separation may not be visually appealing. To address this potential issue, the system 100 may be modified as depicted in FIG. 8. Before describing the system depicted in FIG. 8, it should be noted that like reference numerals used in FIG. 8 refer to like elements depicted in FIGS. 1-7 and described above.

With the system 800 in FIG. 8, the light source 106 is implemented as an array of individual light sources 806-1, 806-2, 806-3, . . . 806-N. As with the system 100 of FIG. 1, each individual light source 806 is coupled to the housing 102. However, in the system of FIG. 8, each individual light source 806 is operable, upon being electrically energized, to emit a light beam 110 (110-1, 110-2, 110-3, . . . 110-N) having a different wavelength (e.g., a different color). It will be appreciated that the number of individual light sources 806 may vary, depending upon the number of different wavelengths that are needed or desired.

As FIG. 8 also depicts, a tunable prism 108 is associated with a different one of the individual light sources 806 and is disposed to receive the light emitted from its associated individual light source 806. Thus, with this embodiment when the system 800 includes N-number of individual light sources 806 (i.e., 806-1, 806-2, 806-3, . . . 806-N), it also includes N-number of tunable prisms 108 (108-1, 108-2, 108-3, . . . 108-N). As previously described, each of the tunable prisms 108 is configured to optically steer the light beam 110 emitted from its associated additional light source 806 based on its deflection angle. As a result, the deflection of the light beam 110 emitted from each associated light source 806 varies in response to the variable voltages supplied to the associated tunable prism 108. As with the system 100 of FIG. 1, the system 800 in FIG. 8 may also, in some embodiments, include a plurality of non-variable lenses 114, such as those described above, where each non-variable lens 114 is associated with, and is disposed between, a different one of the individual light sources 806 and a different one of the tunable prisms 108.

With the system 800 of FIG. 8, white light can be obtained by mixing the individual light beams 110 emitted from each of the different light sources 806. Because the deflection angle ($\alpha$) of the light beam 110 depends on the wavelength and the tunable deflection angle ($\theta$), to achieve the same deflection angle ($\alpha$) for the different light beams 110, the tunable deflection angle ($\theta$) is varied for different light beams 110. For example, when the individual light sources 806 include a light source that emits a blue light beam and another that emits a yellow light beam, the tunable deflection angle ($\theta$) for the tunable prism 108 associated with the blue light will be slightly smaller than the tunable deflection angle ($\theta$) for the tunable prism 108 associated with the yellow light. Overall, the deflection angles ($\theta$) for all of the tunable prisms 108 will be controlled such that the light beam deflection angles ($\alpha$) for all are equal. As a result (though not explicitly depicted in FIG. 8), the tunable prisms 108 will deflect the associated light beams to the same location, which means no color separation will appear and a white light pattern will remain uniformly white.

The light control system described herein implements non-mechanical, two-dimensional beam steering, and is relatively smaller, lighter, and less costly than currently known systems.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A light control system, comprising:
    a housing;
    a controllable power source configured to supply at least four variable voltages;
    a light source coupled to the housing and operable, upon being electrically energized, to emit a light beam; and
    a plurality of cube-shaped tunable prisms coupled to the housing and arranged in an array in a manner in which there are no gaps between adjacent tunable prisms, each tunable prism disposed to receive a portion of the light beam emitted from the light source, each tunable prism having a tunable deflection angle that is variable in two dimensions and configured to optically steer the light beam emitted from the light source in the two dimensions based on the tunable deflection angle, each tunable prism further coupled to receive the four variable voltages from the controllable power source, each tunable prism comprising a liquid that varies the tunable deflection angle in the two dimensions in response to the four variable voltages supplied thereto, whereby deflection of the light beam emitted from the light source varies in response to the four variable voltages supplied to each tunable prism
    wherein:
        the light source is an array of individual light sources, each individual light source coupled to the housing and operable, upon being electrically energized, to emit a light beam having a different wavelength;
        each tunable prism is associated with a different one of the individual light sources and is disposed to receive the light beam emitted from its associated individual light source; and
        each tunable prism is configured to optically steer the light beam emitted from its associated additional light source based on its tunable deflection angle, whereby deflection of the light beam emitted from each associated light source varies in response to the variable voltages supplied to the associated tunable prism.

2. The light control system of claim 1, further comprising a non-variable lens coupled to the housing and disposed between the light source and each tunable prism.

3. The light control system of claim 2, wherein the non-variable lens is configured as a total-internal-reflection (TIR) lens.

4. The light control system of claim 1, further comprising a plurality of non-variable lenses, each non-variable lens coupled to the housing and disposed between the light source and a different one of the tunable prisms.

5. The light control system of claim 4, wherein each non-variable lens is configured as a total-internal-reflection (TIR) lens.

6. The light control system of claim 1, wherein the light source comprises one or more light emitting diodes (LEDs).

7. The light control system of claim 1, wherein the light source comprises one or more lasers.

8. The light control system of claim 1, wherein:
    the four variable voltages include a first variable voltage, a second variable voltage, a third variable voltage, and a fourth variable voltage; and
    each of the cube-shaped tunable prisms comprises:
        first, second, third, and fourth side walls and first and second end walls, the first side wall spaced apart from the second side wall and coupled to, and disposed perpendicular to, the third and fourth side walls, the third side wall spaced apart from the fourth side wall and coupled to, and disposed perpendicular to, the first and second side walls, the first and second end walls spaced apart from each other, the first and second end walls each coupled to, and disposed perpendicular to, the first, second, third, and fourth side walls, whereby the first, second, third, and fourth side walls and the first and second end walls define a cube-shaped inner cavity;
        a polar liquid disposed within the cube-shaped inner cavity;
        a first electrode coupled to the first sidewall and coupled to receive the first variable voltage;
        a second electrode coupled to the second side wall and coupled to receive the second variable voltage;

a third electrode coupled to the third side wall and coupled to receive the third variable voltage;
a fourth electrode coupled to the fourth side wall and coupled to receive the fourth variable voltage; and
a grounding electrode electrically connected to the polar liquid,
wherein:
the first and second end walls are each light transmissive,
a dielectric layer is coated on the first, second, third, and fourth side walls,
a hydrophobic layer overlies the dielectric layer, and
the polar liquid contacts the hydrophobic layer.

9. The light control system of claim 8, wherein the conductive liquid is a saline solution.

10. The light control system of claim 8, wherein each of the cube-shaped tunable prisms further comprises a non-polar liquid disposed within the cube-shaped inner cavity, the non-polar liquid contacting the polar liquid and the hydrophobic layer.

11. The light control system of claim 10, wherein the non-polar liquid is an oil.

12. A tunable prism, comprising:
a cube-shaped housing comprising first, second, third, and fourth side walls and first and second end walls, the first side wall spaced apart from the second side wall and coupled to, and disposed perpendicular to, the third and fourth side walls, the third side wall spaced apart from the fourth side wall and coupled to, and disposed perpendicular to, the first and second side walls, the first and second end walls spaced apart from each other, the first and second end walls each coupled to, and disposed perpendicular to, the first, second, third, and fourth side walls, whereby the first, second, third, and fourth side walls and the first and second end walls define a cube-shaped inner cavity;
a polar liquid disposed within the cube-shaped inner cavity;
a first pair of electrodes coupled, one each, to the first and second side walls;
a second pair of electrodes coupled, one each, to the third and fourth side walls; and
a grounding electrode electrically connected to the polar liquid,
wherein:
the first and second end walls are each light transmissive,
a dielectric layer is coated on the first, second, third, and fourth side walls,
a hydrophobic layer overlies the dielectric layer, and
the polar liquid contacts the hydrophobic layer.

13. The tunable prism of claim 12, wherein the polar liquid is a saline solution.

14. The tunable prism of claim 12, further comprising:
a non-polar liquid disposed within the cube-shaped inner cavity, the non-polar liquid contacting the polar liquid and the hydrophobic layer.

15. The tunable prism of claim 14, wherein the non-polar liquid is an oil.

16. A light control system, comprising:
a housing;
a controllable power source configured to supply at least four variable voltages;
a light source coupled to the housing and operable, upon being electrically energized, to emit a light beam; and
a plurality of cube-shaped tunable prisms coupled to the housing and arranged in an array in a manner in which there are no gaps between adjacent tunable prisms, each tunable prism disposed to receive a portion of the light beam emitted from the light source, each tunable prism having a tunable deflection angle that is variable in two dimensions and configured to optically steer the light beam emitted from the light source in the two dimensions based on the tunable deflection angle, each tunable prism further coupled to receive the four variable voltages from the controllable power source, each tunable prism comprising a liquid that varies the tunable deflection angle in the two dimensions in response to the four variable voltages supplied thereto, whereby deflection of the light beam emitted from the light source varies in response to the four variable voltages supplied to each tunable prism,
wherein the four variable voltages include a first variable voltage, a second variable voltage, a third variable voltage, and a fourth variable voltage, and each of the cube-shaped tunable prisms comprises:
first, second, third, and fourth side walls and first and second end walls, the first side wall spaced apart from the second side wall and coupled to, and disposed perpendicular to, the third and fourth side walls, the third side wall spaced apart from the fourth side wall and coupled to, and disposed perpendicular to, the first and second side walls, the first and second end walls spaced apart from each other, the first and second end walls each coupled to, and disposed perpendicular to, the first, second, third, and fourth side walls, whereby the first, second, third, and fourth side walls and the first and second end walls define a cube-shaped inner cavity;
a polar liquid and a non-polar liquid disposed within the cube-shaped inner cavity;
a first electrode coupled to the first sidewall and coupled to receive the first variable voltage;
a second electrode coupled to the second side wall and coupled to receive the second variable voltage;
a third electrode coupled to the third side wall and coupled to receive the third variable voltage;
a fourth electrode coupled to the fourth side wall and coupled to receive the fourth variable voltage; and
a grounding electrode electrically connected to the polar liquid,
wherein:
the first and second end walls are each light transmissive,
a dielectric layer is coated on the first, second, third, and fourth side walls,
a hydrophobic layer overlies the dielectric layer, and
the polar liquid and the non-polar liquid both contact the hydrophobic layer.

* * * * *